June 14, 1938.    A. F. VICTOR    2,120,476
SAFETY DEVICE FOR PROJECTORS
Filed April 29, 1935    3 Sheets-Sheet 1
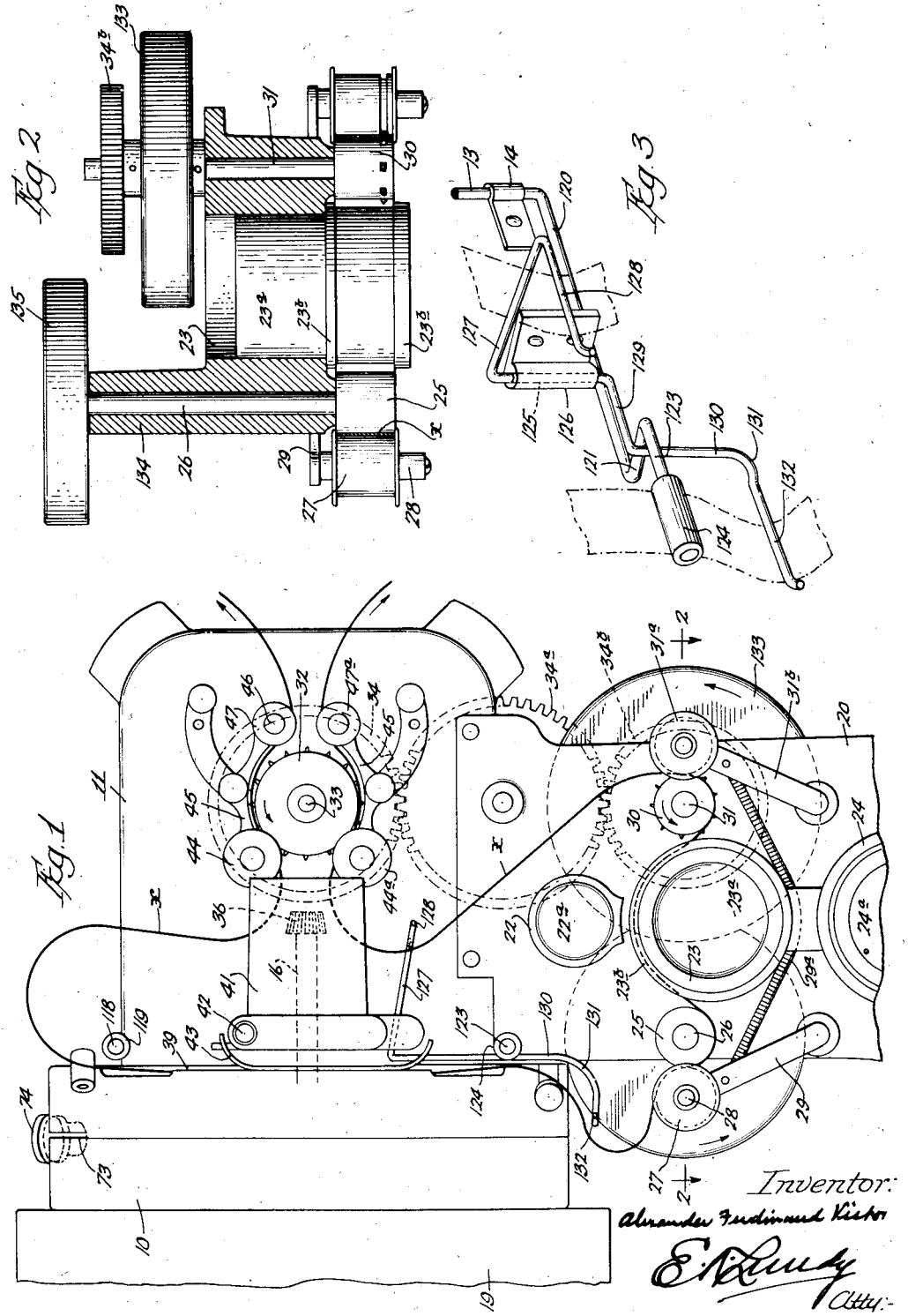
Inventor:
Alexander Ferdinand Victor June 14, 1938. A. F. VICTOR 2,120,476
SAFETY DEVICE FOR PROJECTORS
Filed April 29, 1935  3 Sheets-Sheet 2

Inventor:
Alexander Ferdinand Victor
E. F. Lundy
Atty.

June 14, 1938.  A. F. VICTOR  2,120,476
SAFETY DEVICE FOR PROJECTORS
Filed April 29, 1935     3 Sheets—Sheet 3
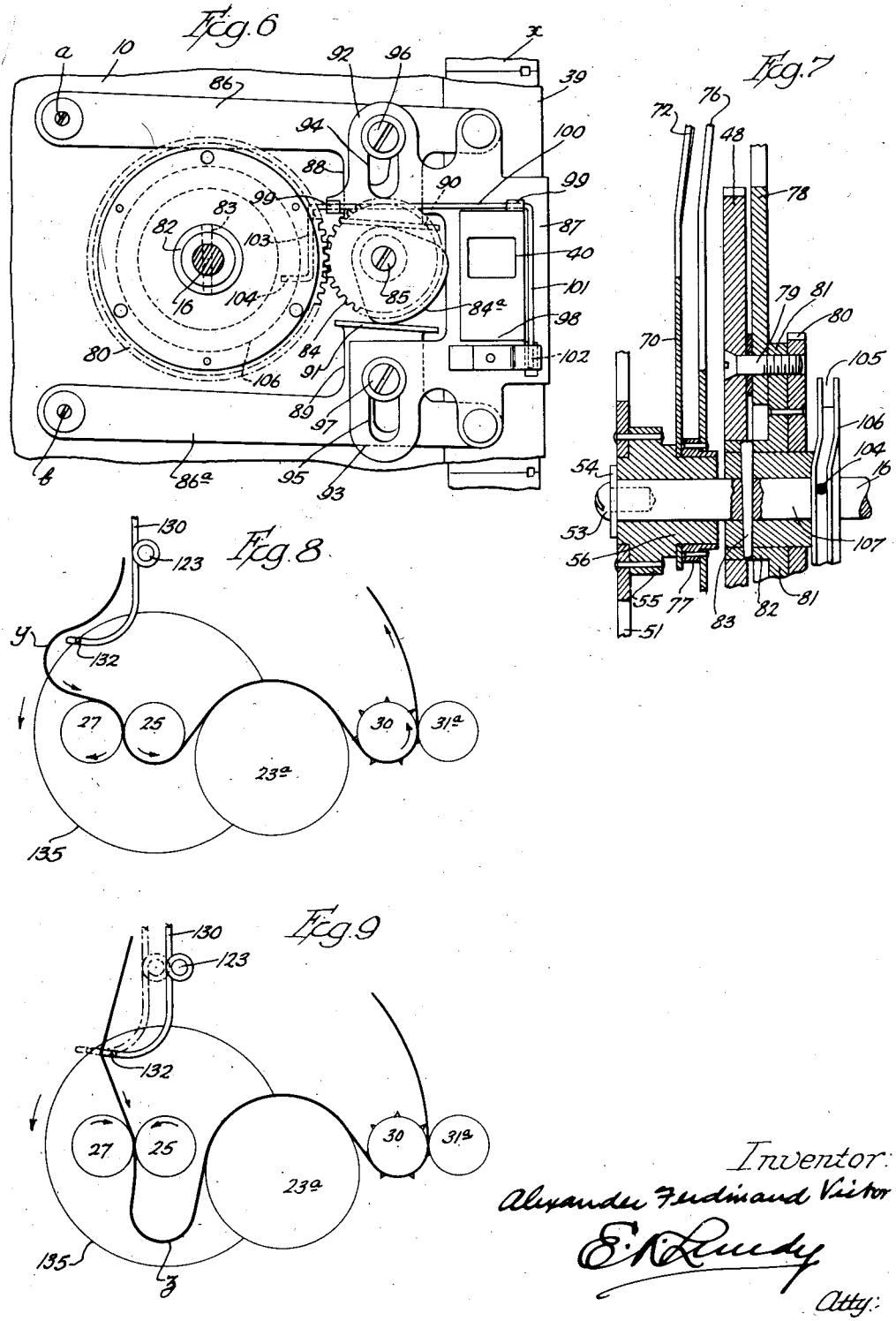
Inventor:
Alexander Ferdinand Victor
E. K. Lundy
Atty.

Patented June 14, 1938

2,120,476

UNITED STATES PATENT OFFICE 2,120,476

SAFETY DEVICE FOR PROJECTORS

Alexander Ferdinand Victor, New York, N. Y.

Application April 29, 1935, Serial No. 18,765

11 Claims. (Cl. 271—2.3)

My invention relates to motion-picture apparatus. Specifically the structure to which my invention is applicable is a cinematographic projector combined with synchronized sound reproduction wherein the "sound-on-film" principle is utilized. The particular improvements which I have devised comprise an automatic safety device that is actuated by the film to interpose a fire-shutter between the lamp and the film to prevent damage to the latter when the film feed devices have been stopped and the lamp remains lit. The principles and structure I have herein disclosed are applied to a cinematographic projector with sound reproduction, but it will be appreciated when said principles and structure are applicable to other apparatus.

The film is moved step-by-step in front of a light aperture by intermittent feed mechanism, and it is advanced to and withdrawn from such mechanism by continuously operating elements such as rotatable sprockets. Therefore slack loops are formed in the film as it approaches and after it leaves the intermittent feed mechanism. In my present structure I have utilized the portion of the film forming a loop to operate a trigger structure that releases the safety shutter or screen to permit the latter to move to a position which prevents the light rays from the lamp reaching the film in front of the light aperture.

In order to utilize the looped portion of the film in the above stated manner, I have devised novel means whereby the slack of the loop may be taken up automatically to actuate the trigger. This take-up of the loop is accomplished in an effective manner through the medium of a fly-wheel that is set in motion by the film when the latter is moving at its normal speed through the projector, which fly-wheel continues to rotate, due to its inertia, when the film has been stopped. The fly-wheel spindle carries a roller that is engaged with the film between the intermittent feed mechanism and the sound gate, and, during operation of the apparatus, the film, due to its engagement with the roller, will turn the latter and the fly-wheel will be driven so that it will assist in causing the film to move smoothly past the sound gate in addition to providing the means for initiating the operation of the safety devices. It will be noted that when the intermittent feed of the film is stopped the normal slack loop which theretofore was disposed between said feed and the fly-wheel roller is advanced beyond this roller to a point between said roller and the sound gate but not past the latter, so that there is no change in relationship between the frame which has stopped in front of the light aperture of the projector and the portion of the sound track which has stopped at the sound gate. Hence the synchronization of the action and sound has not been disturbed.

The objects and advantages of my invention reside in providing a mechanism of the character herein described that is simple in construction; that may be readily incorporated in a small projector for amateur use; that is easy to manipulate; that is dependable in operation; and is novel in the arrangement of its parts. Further objects and advantages will be apparent to persons, skilled in the art, after the construction and operation of my improvements are understood from the within description.

I prefer to practice my invention and to accomplish the numerous objects thereof in substantially the manner hereinafter fully described and as more particularly pointed out in the appended claims, reference being herein made to the accompanying drawings that form a part of this specification.

In the drawings:—

Figure 1 is a vertical elevation of the side of a motion-picture projector showing my improvements incorporated therein.

Figure 2 is a horizontal section taken on line 2—2 of Figure 1, looking down in the direction indicated by the arrows.

Figure 3 is a skeletonized perspective of the film-engaging arms that are moved by the film to release the safety shutter or screen.

Figure 6 is a vertical elevation of the intermittent feed devices.

Figure 7 is a fragmentary section on line 7—7 of Figure 5 looking in the direction of the arrows and enlarged.

Figures 8 and 9 are views showing schematically different positions of the film in actuating the safety devices.

Figure 4:
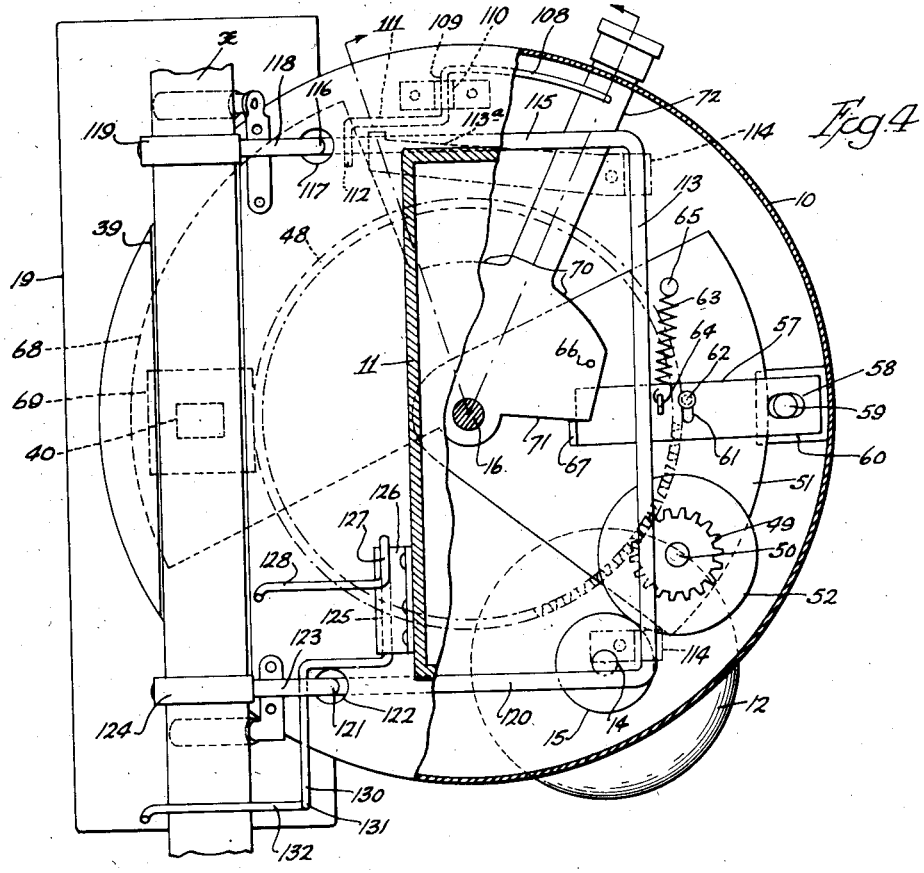
Figure 4 is a view partly in elevation and looking towards the film guide with a portion of the housing wall removed for clearness.

The drawings are somewhat schematic for the purpose of disclosing a typical or preferred embodiment of my invention, and in said drawings like reference characters identify like parts wherever said parts appear in the different views. The apparatus disclosed is adapted for utilizing 16 mm. film for both silent motion-pictures and sound motion-pictures, the latter type employing what is known as the "sound-on-film" principle, and the projector is adapted for amateur use.

Figure 5:
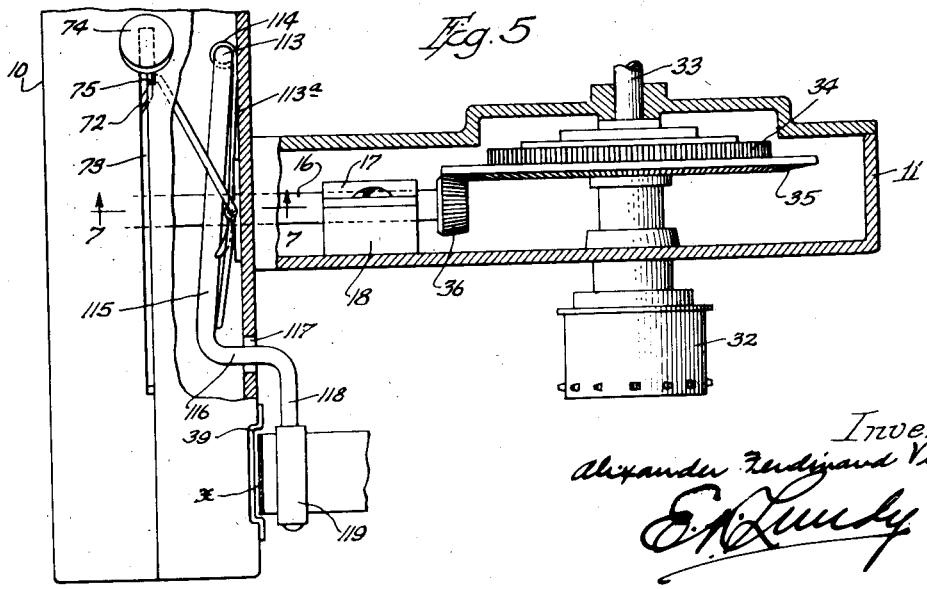
Figure 5 is a view looking down at the top of a portion of the apparatus with a portion of the housing in section and broken away, the film gate and projection lens-tube being omitted.

Referring more particularly to Figures 1, 4 and 5, it will be seen the body portion of the apparatus consists of a circular or cylindrical two-part housing 10 that encloses the intermittent film feeding devices and the safety shutter or screen, and a laterally disposed rectangular shaped housing 11 that extends at a right-angle from the front circular wall of housing 10 and encloses another portion of said mechanism, which may be designated as the drive. These combined housings also provide suitable supports and bearings for the various elements and parts of the mechanisms hereinafter described. An electric motor 12 is mounted back of the cylindrical housing 10 and the motor shaft 14 projects inside the cylindrical housing 10 where its end is provided with a friction drive pulley 15. A horizontally disposed shaft 16 is mounted in suitable bearings in housing 10 and projects into the rectangular housing 11 where it has its forward end supported in a bearing 17 on a bracket 18 projecting from the walls of the housing 11.

Back of the cylindrical housing 10 there is the lamp house 19 which provides the illumination for projecting the pictures upon the screen. The housings, including the motor, are supported upon the upper portion of an upright standard 20 having a suitable base (not shown). Several tubular sockets or pockets 22, 23, and 24 are formed transversely in the standard 20 and are arranged with horizontal axes and vertically alined. These sockets receive respectively the photo-electric cell 22ª, the sound lens 23ª, and the exciter lamp 24ª that comprise the elements which photo-electrically pick up the sound from the sound track on the margin of the film and electrically transmit the same to the amplifier, tone-control and other devices usually employed in the reproduction of sound. These latter elements may be any of the well-known types that may be found desirable for the functions performed.

The intermediate element 23ª of the sound group just mentioned protrudes from its socket and has a polished exterior surface and a pair of circumferential flanges 23ᵇ that are spaced apart a distance to provide a depressed guide track in which the film $x$ slides. The film is maintained in the guide track by engagement with the lower segment of a smooth roller 25 secured to an end of a freely rotatable spindle 26 projecting laterally from standard 20, which roller is engaged by a flanged roller 27 rotatably carried on a lateral spindle 28 projecting from the upper free end of an automatically returnable swinging arm 29 that is pivotally mounted at its lower end on the adjacent portion of the standard.

After passing up from roller 25 and then over the guide track on element 23ª the film passes down and partly around an auxiliary drive sprocket 30 that is fast on a rotatable spindle 31 to move the film upwardly in a slack loop to the main drive sprocket 32. The latter or main sprocket is fast on a rotatable spindle 33 journaled in bearings in the vertical side walls of the lateral rectangular housing 11. The film is retained on lower sprocket 30 by a flanged roller 31ª carried on a spindle on the upper free end of an automatically returnable swinging arm 31ᵇ that has its lower end pivotally mounted on the standard. A coiled contraction spring 29ª connects the arms 29 and 31ᵇ so that they will automatically return to normal positions whenever they are moved during threading of the film.

The upper sprocket spindle 33 and the lower sprocket spindle 31 are operatively connected by a suitable gear-train, shown dotted in Fig. 1, so that the film is moved at the same speed by the respective sprockets and the loop of film between said sprockets is constantly maintained with the desired amount of slack.

Within the housing 11 the sprocket spindle 33 has the upper gear 34 of the gear-train secured to it and there is also a large beveled gear 35 fast on it alongside gear 34. The adjacent end of the main driven shaft 16 carries a beveled pinion 36 that meshes with and drives the beveled gear 35 whereby the sprockets 30 and 32 are synchronously rotated, the former through the medium of the meshed gears 34ª and 34ᵇ. Gear 34ª is an idler or transmission gear and the gear 34ᵇ is secured to the spindle 31 to which the lower sprocket 30 is secured.

The front wall of cylindrical housing 10 is provided with a depressed film guide channel 39 extending vertically across the front wall and spaced from the adjacent or rear portion of the rectangular housing 11. At about midway its height the film guide is provided with the rectangular shaped aperture element 40 that frames the pictures in the usual manner, and in front of this aperture element, and axially alined therewith, is the tubular lens-mount 41 that is hinged upon a pivot member 42 so that it may be swung upward to permit placement or removal of the film with respect to the guide. A freely yieldable shoe 43 is supported at the rear end of the lens-mount in a position to enter the film guide and maintain the film ribbon movably therein.

The advancing portion of the film is engaged with the upper segment of the continuously rotating sprocket 32 and is retained thereon by a flanged and grooved roller 44 that is rotatably mounted on a lateral spindle at the adjacent end of a hinged arm 45 having its other end movably mounted on a pintle 46. There is also a guide roller 47 on the pintle so that the film may pass under it in its advancing movement from the supply reel (not shown) to the sprocket 32. As shown in Figure 1, the film is looped upwardly to provide slack between the sprocket 32 and the place where the film enters the upper portion of the film guide 39 to be engaged by the intermittent feed devices.

After the film has passed out of the film guide it is formed into a shallow lateral loop before it passes beneath the roller 25, and another loop is provided between the sprockets 30 and 32. A flanged retainer roller 44ª and idle roller 47ª on a swinging arm 45ª maintain the film on the under segment of sprocket 32.

Within the cylindrical housing 10 the main driven shaft 16 has a large gear 48 secured on it that derives motion from a pinion 49 rotatably mounted on a short spindle 50 at the lower corner of the face of a triangular-shaped oscillatory plate 51. There is a friction pulley 52 fastened to the pinion 49 so that it rotates therewith, and the edge of said pulley engages the edge of friction drive pulley 15 on the motor shaft when the apparatus is operating to move the film. The separation of these friction pulleys acts as a throw-off to automatically disconnect the motor from the film actuating and control mechanism while the motor continues to run. It will be understood a suitable clutch device may be substituted for the separable friction roller, since the latter acts in the same manner as a clutch.

By reference to Fig. 4 it will be seen that one of the edges of this triangular carrier plate is segmental shaped, while the other edges of plate 51 converge towards each other and terminate in a rounded apex that points in a horizontal direction beyond the adjacent end of shaft 16.

The apex of plate 51 is provided with an aperture that fits over the reduced portion of and is riveted to the flange 55 of a shouldered bushing 56 that may be rotated or rocked on the end of the shaft 16 and permits rotation of the shaft independently thereof. A retainer washer 54, secured to the end of the shaft by a bolt 53, maintains the bushing on said shaft.

An automatically returnable rock-lever 57, preferably a metal strip, is mounted on the same face of the triangular carrier plate with the pinion 49, and one end of the rock-lever protrudes beyond the segmental edge of the plate where it is provided with a slightly elongated aperture 58 that engages a stud 59 on a bracket 60 projecting from the cylindrical wall of housing 10. The rock lever has a transverse slot 61 about midway its length that engages with the shank of a headed pin 62 projecting from the carrier plate 51, and a coiled contraction spring 63 has one end connected to a lug 64 on said rock-lever and its opposite end secured to a pin 65 on the carrier plate.

A stop 66 on the carrier plate limits upward movement of the inner end portion of the rock-lever and there is a lateral flange 67 at the end of the lever adjacent said stop.

The construction of the rock-lever and its arrangement upon the carrier plate is such that when downward pressure is exerted upon end flange 67 the lever will pivot upon stud 59 and the headed pin 62 will permit movement until the pin engages the upper end of the transverse slot 61 as shown in Figure 4. Thereafter, further downward pressure will cause the carrier plate to pivot at its apex with the shaft 16 as its axis and swing down until the friction pulley 52 has firmly engaged the friction pulley 15 on the motor shaft. The motor should be rotating the pulley 15 at this time and it then begins to drive the film feeding and other devices that have heretofore been out of operation. In order to separate the rollers 52 and 15 all that it is necessary to do is to release the downward pressure on the rock-lever 57 and the spring 63 will then be able to pull it upwardly thereby returning the carrier plate 51 to its uppermost position and disengage throw-rollers 15 and 52. This constitutes the throw-off of the mechanism, the action of which is similar to the setting and leasing of the parts of a clutch.

In order to operatively "set" the structure:— that is, to move the rock-lever and carrier plate downwardly, I have provided a manually movable, automatically returnable element of somewhat irregular shape. This element is a metal plate that is mounted on the bushing 56 against a shoulder thereof and is free to swing thereon whenever operated.

The major portion 68 of the plate constitutes a safety element known as a fire-screen which becomes interposed between the lamp and the film when the movement of the latter is stopped. This major portion or fire-screen 68 is substantially a quadrant of a circular disk as shown in Figure 4 and is provided with a window 69 near its lower corner that is larger than the projection aperture 40 with which it alines during projection of the film pictures. The remaining portion of the plate is in the form of a smaller segmental extension 70 of less diameter than the fire-screen and slightly more than a quadrant and has a straight radial edge 71 that is adapted to engage with the lateral flange 67 at the adjacent end of the rock-lever.

An operating arm 72 projects radially from the segmental extension 70 and passes out through a narrow annular slot 73 in the cylindrical wall of housing 10 where it is provided with a head or finger-grasp 74. At the end of the slot there is a recess or notch 75 (Fig. 5) to receive the arm and intermediate its ends the arm is bent or deflected in order to insure its seating in said recess.

I have provided a bowed bridge-bar 76 that has lugs at its ends to fit into notches in the housing wall, and at its center of length said bar is provided with an aperture that has a shouldered sleeve 77 riveted to it to fit over the adjacent portion of the bushing 56 on the carrier plate.

The bridge bar is bowed slightly so that its central portion is urged in a direction towards the adjacent end of the shaft 16 in order to maintain the plate comprising the fire-screen, etc., on the bushing 56 as well as to urge the latter towards the retaining washer 54.

It will be seen, the carrier-plate 51 and the fire-screen are capable of rotatory reciprocatory or oscillatory movement independently of each other and independently of the shaft 16, and the latter may rotate without moving the first-named parts which are supported thereon. The projection shutter 78 for intermittently displaying the successive frames or pictures of the film is fastened to one of the faces of the gear 48 by means of screws 79 that pass through these elements and into a cam drive pinion 80. An annular flange 81 on a sleeve 82 is interposed between the shutter 78 and gear 80 to separate them a slight distance apart. The sleeve extends centrally through the shutter 78 and the gear 48 on the opposite side of the latter and said sleeve is anchored to the shaft 16 by a transverse pin 83.

The mechanism for intermittently moving the film past the aperture 40 may be any of the desirable or well-known types, such for example as that shown in detail in Figure 6 of the drawings. This mechanism consists of a pinion 84 mounted on the smooth shank of a screw stud 85 and in mesh with the gear 80 so that it is driven thereby.

A triangular cam 84ª is secured to the hub of pinion 84, and by its rotation, will oscillate a shuttle-plate 87 in a vertically reciprocal direction. The shuttle-plate is pivotally connected to vertically oscillatory horizontal arms 86 and 86ª, which are mounted on pivots a and b on the front wall of the cylindrical housing, and are provided with lateral lugs 88 and 89 that project towards each other and have outwardly extended lateral flanges or shoulders 90 and 91 that are engaged by the edge of the cam 84ª.

The shuttle-plate has upper and lower lateral extensions 92 and 93 that are provided with vertical guide-slots 94 and 95 to cooperate with headed studs 96 and 97 on the housing wall to guide the shuttle plate in its vertical reciprocatory movement back of the projection aperture 40 and there is a large window 98 in the shuttle-plate to prevent obstruction of light rays, during movement of said plate.

Pivotally mounted in knuckles 99 on the shuttle-plate above the window and on the upper extension 92 is an inverted U-shaped wire 100, the lower end of arm 101 of which is bent laterally to provide a finger or claw 102 that successively enters the film perforations through slots in the shuttle plate and the housing wall whereby to intermittently move the film down in the film-guide channel 39 past the light aperture.

The claw 102 is withdrawn from the film during the upward movement of the shuttle-plate while the film is momentarily at rest, and in order to do this I provide the other arm 103 of the wire with a lateral finger 104 that extends behind pinion 80 and enters a cam groove 105 in the periphery of a circular cam-disk 106 that is secured to shaft 16 and the hub 107 of this cam disk extends through pinion 80 and into the sleeve 82 where it is anchored to the shaft by pin 83. During rotation of the cam-disk 106 its groove moves the finger 104 to rock the arm 101 back and forth to insert or withdraw the claw 102 from the film perforations.

In order to throw-off or disconnect the film feed and other driven mechanisms from the motor at any time, while the motor is running, I have provided a trigger that is adapted to dislodge the arm 72 from the notch or recess 75 and allow it to automatically return to the opposite end of the slot 73, thus permitting the edge 71 of the fire-screen to release the carrier plate which will be raised by spring 63 to disengage roller 52 from motor roller 15.

This trigger device consists of a length of wire bent zig-zag or Z-shape to provide a horizontal swinging arm 108 with its free end disposed near or against the arm 72 when the latter is in the notch 75. An intermediate portion 109 of the wire is transversely and vertically disposed with respect to the portions of the wire on each side of it and provides the hinge or pivot of the trigger and is movably mounted in a retainer 110 mounted on the wall of housing 10. The other horizontal arm 111 of the trigger projects from the central pivot portion opposite to arm 108 and has a down-turned end 112 to be engaged and moved by an element of the devices which operate the trigger to push the arm 72 out of its notch.

The trigger is coordinated with a structure having members that are moved by the film whenever the slack in a loop becomes taut. For this purpose I provide a U-shaped rocking frame of heavy wire, the connecting vertical member 113 of which is swingingly mounted in upper and lower bearing knuckles 114 mounted on the front wall of housing 10. The upper swinging arm 115 of this U-frame extends horizontally past the lateral end 112 of the trigger, preferably in contact therewith, and it has an off-set portion 116 that passes through a hole 117 in the housing wall, and then extends across the front of the film guide in the form of trip-arm 118 within the upper or feed loop of the film.

An antifriction roller 119 may be mounted on the end of trip-arm 118 to be engaged by the film, and a light spring 113a is mounted on the housing wall with its free end engaged with an intermediate portion of the arm 115 to yieldably urge it away from said wall and the down-turned end 112 of the trigger.

The lower arm 120 of the rock frame extends along the inside of the housing wall parallel to the upper arm, and has an off-set portion 121 that passes through an opening 122 in the housing wall, and its trip-arm 123 projects past the film guide 39 and is provided with a friction roller 124, within the lower or take-up film loop (not shown) that is present when the film is threaded for silent pictures.

When the film in either loop is tightened the film will pull the trip arms 118 or 123 outwardly away from the guide which rocks the U-shaped frame in its bearings 114, causing the upper arm 115 to swing the lateral member 112 of the trigger device backwardly, thus rocking the trigger device so that the member 108 thereof will push the lever 74 out of the notch 75 so that the lever will move to the other end of its slot 73. This releases pressure on the rock-lever 57 and the carrier plate will swing up to separate the transmission friction roller 52 from the motor roller 15.

The motor will continue to drive its roller 15, but the latter having been disconnected from roller 52, the motion of the roller 15 is not transmitted to any of the film moving mechanisms, either the intermittent feed or the sprocket feed. Simultaneous with this action the fire-screen 68, which is a part of the arm 72, will move in front of the aperture 40 to shut off the light rays and prevent damage to the film.

Another trip device is formed from a piece of small gauge wire, bent in irregular shape. An intermediate vertical portion 125 of this wire is rotatably mounted in a knuckle 126 on the outside of housing 11 which permits lateral portions of this trip to swing. An upper swinging arm 127 projects forwardly from part 125 with its outer end bent laterally to provide a horizontal trip-finger 128 positioned in front of the adjacent film loop.

At the lower end of part 125 the wire is bent horizontally substantially parallel with the swinging arm 120 of the U-shaped frame and extends to a point beyond the off-set 121, to provide a reach 129 and at the outer end of the reach the wire has a depending vertical extension 130 that is disposed in the re-entrant angle of off-set 121 and trip arm 123.

The lower portion of the part 130 is formed with a segmental curve 131 and at the end of the latter the wire is bent to provide a lateral and horizontal trip finger 132 that is positioned inside the shallow film loop formed above the rollers 25 and 27. The film enters between these rollers at a point that is immediately below and in substantially the vertical plane of the film guide 39 and said trip finger 132 is off-set with respect thereto so that tightening of this loop will move the trip finger.

In the event any of the loops under the control of the trips or fingers becomes taut the structure will be operated to dislodge the control arm 72 from its notch to stop the feed and at the same time interpose the fire-screen 68 between the lamp and the film.

By reference to the lower portion of Figure 1 and the schematic illustration in Figure 8, it will be seen that the film is moved across the sound lens 23a by the sprocket 30 secured to the spindle 31 that is driven by the lower gear 34b of the transmission gear-train, so that the rotation of said sprocket is synchronized with the rotation of the film advancing and take-up sprocket 32.

A balance-wheel 133 is secured to the lower sprocket spindle 31 to insure a regulated even movement to the rotating or moving parts of the structure. The spindle 26, upon which the idler 25 is secured, has its other end projected beyond its bearing boss 134 on the standard 20 and has a free fly-wheel 135 secured to it. The pull of the sprocket 30 upon the film draws the latter firmly against the member 32ª and the lower segment of idler roller 25 is frictionally engaged by the film so that said roller and its spindle are rotated by the movement of the film. Consequently the free fly wheel 135 is rotated at the same speed as the roller 25. When the film is threaded in engagement with the elements just described, in the manner shown in Figure 8, a slack loop y is formed in the film after it has been moved intermittently through the film guide 39 and before the film is frictionally engaged with the continuously rotating roller 25.

This loop y is relatively small or shallow and the finger 132 of the trigger is disposed in this loop in a position where a tightening of the film forming the loop will cause the finger to be engaged by the film and moved to the right, as shown in Figure 9. This movement of the finger is utilized to operate the trigger and throw-off devices and thereby disengage the friction pulleys 15 and 52 to stop the feed of the film and interpose the fire-screen.

The feeding mechanism and associated mechanisms may be stopped by the operator who may manually disengage the operating or shift lever 72 from its notch and permitting it to move to the other end of the guide slot. When the feed mechanism has been stopped in this manner, the inertia of the free fly-wheel 135 will continue to rotate the idler roller 25 and the loop of film y just ahead of or above this roller will be tightened so that the film engages the finger 132 and operates the safety devices. Due to the fact that the film is frictionally engaged between rollers 25 and 27, the loop y which had theretofore been formed above the rollers is re-formed as at z in Figure 9 below the rollers and in that portion of the film which is between said rollers and the surface of the sound element 23ª.

When the operating arm 72 is moved back into its notch, the intermittent feed structure will commence again to move the film step-by-step through the guide, past the aperture 40, and the loop y will be re-formed at its normal location while the loop z will be taken up by the feed sprocket 30 which draws the film across the sound element 23ª until it has been tightened thereon as well as upon the lower segment of the idler roller 25. Up to this moment the free-fly-wheel 135 has not begun to rotate, but it will now commence its rotation in the same manner as prior to the stoppage of the mechanism.

It will be seen the free fly-wheel 135 is set in motion and is actuated by the moving film, and, upon a cessation of movement of the film, the inertia of said fly-wheel will carry the portion of the film adjacent roller 25 to a point where loop y is taken up and the tightened film operates the trigger, and while this loop is disappearing the lower loop z is being formed beyond the idler roller 25 and before the portion of the film in said loop z reaches the sound aperture. Obviously the synchronized relation between the picture frame that is stopped in front of the light aperture and the sound track at the sound slit is not disturbed by the operation of the safety devices or the formation of the safety loop z above described.

My invention is herein disclosed in connection with cinematographic apparatus wherein the strip that passes through the mechanism is a film with marginal perforations that are engaged by an element for intermittent movement through the guide at the light aperture, and the other elements that engage the film for moving the latter operate continuously. Obviously my invention is well adapted for use in feeding strips of various materials, such as fabric, paper, etc., and a continuous feed may be substituted for the intermittent or step-by-step feed herein disclosed. All such modifications are contemplated as embraced within the scope of the appended claims, and the drawings and within description show a typical or preferred embodiment of the structure and are given for the purpose of clearness of understanding.

What I claim is:

1. Apparatus of the character described comprising devices for feeding a strip in which a slack loop is formed, a source of power, devices operatively connecting the feeding devices to said source of power including separable elements, means for separating said elements to disconnect said feed devices from the source of power and arrest movement of the strip past the feed devices, a fly-wheel normally actuated by the moving strip, the inertia of which fly-wheel upon cessation of operation of said feed devices being adapted to tighten the slack loop and form another loop in the strip at a different location than the first loop, and a trigger projecting into the slack loop and actuated by the strip upon the tightening of the first slack loop, said trigger having operative connection with said separating means whereby to release the latter to arrest operation of the feeding devices.

2. Apparatus of the kind described comprising strip feeding devices, actuating means therefor including a throw-off device for disconnecting said actuating means from a driving element, means for withdrawing the strip from said feeding devices, an idle roller engaged with the strip and rotated thereby, there being normally a slack loop in the strip between said idle roller and said feeding devices, a portion of said throw-off device being disposed in said loop, and an inertia element driven by said idle roller, whereby cessation of said feeding devices and said withdrawing means tightens the slack in said loop to actuate said throw-off device and re-forms the loop in the strip between said idle roller and said withdrawing means.

3. Apparatus of the kind described comprising strip feeding devices, actuating means therefor including a throw-off device for disconnecting said actuating means from a driving element, means engaged with the strip for withdrawing it from said feeding devices, an idle roller engaged with the strip and rotated thereby, there being normally a slack loop in the strip between said feeding devices and said withdrawing means on one side of said idle roller, a portion of said throw-off device being disposed in said loop, and an inertia element driven by said idle roller, whereby cessation of said feeding devices and withdrawing means tightens the slack in said loop to actuate said throw-off device and reforms the loop in the strip on the other side of said idle roller.

4. Apparatus of the kind described comprising strip feeding devices, actuating means therefor including a throw-off device for disconnecting said actuating means from a driving element, means for withdrawing the strip from said feeding devices, an idle roller engaged with the strip and rotated thereby, there being normally a slack loop in the strip between said feeding devices and said withdrawing means, a portion of said throw-off device being disposed in said loop, and an inertia element opposing and driven by said idle roller, whereby cessation of said feeding devices and said withdrawing means tightens the slack in said loop to actuate said throw-off device and the continued movement of said inertia element forms a loop in the strip between said idle roller and said withdrawing means.

5. Apparatus of the kind described comprising strip feeding means, opposed rollers between which the strip passes to rotate them and maintain a slack loop in the strip between said feeding means and said rollers, a take-up sprocket engaged with the strip beyond said rollers, inertia means actuated by one of said rollers, power means, transmission mechanism operatively connecting said power means to said feeding means and sprocket, devices for releasing the operative connection between said power means and transmission mechanism whereby to discontinue movement of the feeding means and take-up sprocket, said inertia means adapted thereupon to continue the rotation of said rollers to tighten the aforesaid slack loop and form a new slack loop between said rollers and said sprocket.

6. Apparatus of the kind described comprising strip feeding means, actuating means therefor including a throw-off device for disconnecting said actuating means from a driving element, a take-up element engaged with the strip for withdrawing the strip from said feeding means, an idle roller between said feed means and said take-up element which said roller is engaged and rotated by said strip, there being normally a free loop in the strip between said feeding means and said idle roller, a portion of said throw-off device being disposed in said loop, and an inertia device driven by said roller and adapted to continue movement after cessation of said feeding means whereby to tighten the said normal slack loop to actuate said throw-off device and re-form another loop in the strip between said idle roller and said take-up element.

7. Apparatus of the kind described comprising film feeding devices, actuating means therefor including a throw-off device for disconnecting said actuating means from a driving element, opposing members engaged with and actuated by the film, there being a slack loop in the film normally between said feeding devices and members, a portion of said throw-off device being disposed in said loop, means for withdrawing the film normally taut from said members, and momentum-creating means actuated by said members and adapted to continue movement after cessation of said feeding devices to move the film whereby the normal loop is closed to actuate said throw-off device and thereafter a temporary loop is formed between said opposing members and said withdrawing means.

8. Apparatus of the kind described comprising film feeding devices, actuating means therefor including a throw-off device for disconnecting said actuating means from a driving element, means for withdrawing the film from said feeding devices, there being a slack loop in the film immediately beyond said feeding devices, a portion of said throw-off device being disposed in said loop, and a momentum-creating structure actuated by the film, said structure disposed between the slack loop and said withdrawing means and adapted to continue movement after cessation of said feeding devices, whereby to tighten the slack in said loop to actuate said throw-off device and thereafter form a temporary loop between said structure and said withdrawing means.

9. Apparatus of the kind described comprising strip feeding devices, a take-up roller engaged with and adapted to withdraw the strip from said feeding devices, actuating means for simultaneously operating said devices and roller and including a throw-off device for disconnecting said actuating means from a drive element, an idle roller located between said feeding devices and said take-up roller, said idle roller being engaged with the strip and adapted to be rotated thereby when the strip is normally moved, means for maintaining the strip in frictional engagement with said idle roller, and momentum-creating means actuated by said idle roller and adapted to continue movement after cessation of said feeding devices, there being a slack loop in the strip between the feeding devices and said idle roller adjacent a portion of said throw-off device during operation of said feeding devices and take-up roller, whereby said loop is rendered taut upon cessation of said feeding devices to operate said throw-off device and said loop is thereafter re-formed by the momentum-creating means.

10. Apparatus of the kind described comprising strip feeding devices, a take-up roller engaged with and adapted to withdraw the strip from said feeding devices, actuating means for simultaneously operating said devices and roller and including a throw-off device for disconnecting said actuating means from a drive element, an idle roller located between said feeding devices and said take-up roller, said idle roller being engaged with the strip and adapted to be rotated thereby when the strip is normally moved, means for maintaining the strip in frictional engagement with said idle roller, and momentum-creating means actuated by said idle roller and adapted to continue movement after cessation of said feeding devices, there being a slack loop in the strip between the feeding devices and said idle roller adjacent a portion of said throw-off device during operation of said feeding devices and take-up roller, whereby said loop is rendered taut upon cessation of said feeding devices to operate said throw-off device and said loop is thereafter re-formed by the momentum-creating means, the aforesaid structure, upon re-starting of the feeding devices, adapted to take-up the last formed loop and form a loop at the first location, said last-mentioned loop take-up and re-forming strip occurring simultaneously.

11. Apparatus of the kind described comprising strip feeding means, actuating means therefor including a throw-off device for disconnecting said actuating means from a driving element, a driven take-up sprocket for moving the strip away from said feeding means, opposing idle rollers engaged with and rotated by the strip, the strip being normally taut between said rollers and sprocket and there being a free loop in the strip between said feeding means and said rollers, a balance-wheel rotated by one of said rollers, a trip for operating said throw-off, a portion of said trip disposed in the strip loop, and adapted to be engaged and moved by the strip upon tightening of said normal loop whereupon said sprocket and feeding means cease movement and the inertia of said balance-wheel continues to rotate said idle rollers to re-form the strip loop between said rollers and said sprocket.

ALEXANDER FERDINAND VICTOR.